2,844,572

VISCOSITY CONTROL AND STABILIZATION OF HALOGENATED HYDROCARBON RESINS WITH METALLIC SALTS OF OXYGEN ETHER ACIDS

Floyd R. Hansen, Bedford, and Stanley B. Elliott, Walton Hills, Ohio, assignors to Ferro Chemical Corporation, Bedford, Ohio, a corporation of Ohio No Drawing. Application July 6, 1954
Serial No. 441,671

5 Claims. (Cl. 260—92.8)

This invention relates to new compositions of matter and more particularly to reduced viscosity and increased stabilization of chlorine containing vinyl resins.

In general, chlorine containing vinyl resins, such as, polyvinyl chloride, polyvinylidene chloride and their copolymers with each other and with other monomer groups have very poor resistance to the effects of light and/or heat. It is well known to those skilled in the art that the addition of stabilizers to these halogenated hydrocarbon resins increases their viscosity and in many instances these stabilizers increase viscosity to the point where the resins become substantially unworkable.

It is, therefore, the principal object of the present invention to provide a method and means for simultaneously controlling viscosity while providing maximum stabilization to the effects of light and/or heat.

A further object of this invention is to provide viscosity control and stabilizing agents which are economical and easy to incorporate into the halogenated hydrocarbon resins.

Other objects will appear as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention may be employed.

Broadly stated the present invention comprises a stabilizing and viscosity reducing composition for halogenated hydrocarbon resins comprising a metal salt of the formula

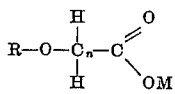

where R represents a radical of 4 to 20 carbons selected from the group consisting of alkyl, aryl, alkaryl and aralkyl and $n$ is an integer of 1 to 3 and M is metal selected from the group consisting of cadmium, zinc and tin.

From the foregoing broad statement it will be noted that the acids for the salts are oxygen ether acids of the general formula

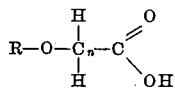

where R represents a radical of 4 to 20 carbons selected from the group of alkyl, aryl, alkaryl and aralkyl and $n$ is an integer of 1 to 3. Typical examples of such acids useful in the present invention are:

2-ethyl butoxy propionic
2-ethyl hexoxy propionic
2-ethyl butoxy acetic
2-ethyl hexoxy butyric
Di-amyl phenoxy propionic
Alpha phenyl ethoxy acetic
Beta phenyl ethoxy acetic The effective concentration for such salts is about 0.1% to 8.0% based on the halogenated hydrocarbon resin.

So that the present invention may be more clearly understood, the following examples are offered as being illustrative of the present invention:

I 100 parts polyvinyl chloride
47 parts di-octyl phthalate
1 part cadmium 2-ethyl butoxy propionate The above ingredients were added together and then milled on a two roll mill at 350° F. The composition turned dark yellow at about 60 minutes. The same composition omitting the stabilizer of the present invention turned black at 20 minutes.

II 100 parts polyvinyl chloride
47 parts di-octyl phthalate
1 part zinc 2-ethyl butoxy acetate The same results as in Example I were noted.

III 100 parts polyvinyl chloride
47 parts di-octyl phthalate
1 part tin 2-ethyl hexoxy butyrate The results noted were the same as in Example I.

While the foregoing examples give a standard resin composition using polyvinyl chloride and di octyl phthalate as the plasticizer it is to be clearly understood that ther halogenated hydrocarbon resins containing other plasticizers are equally as well stabilized.

The stabilizing agents of the present invention may be incorporated into the resin by a number of methods. They may be added to the solid resin and mixed therein by means of hot rolls or other mixing machines adapted to mix solid resins. They may also be dispersed in a suitable liquid and then mixed with the resin, or the dispersion of the stabilizer may be mixed with a solution of the resin. The only important requisite is that the stabilizers and resins are thoroughly mixed and dispersion is as complete as possible.

As is well known to those skilled in the art, the addition of stabilizers to plastisols increases the viscosity of the plastisol mixture.

IV 100 parts polyvinyl chloride
80 parts di-octyl phthalate
1 part cadmium 2-ethyl hexoxy propionate This plastisol mixture showed the following advantages:

A. Gave a viscosity at the end of 3 days of 4,800 centipoises vs. 7,000 centipoises for a similar composition containing a well-known Cd octoate stabilizer and 6,600 centipoises for the same formulation containing no stabilizer.

B. The final cured plastic showed exceptional clarity over the Cd octoate stabilizer.

C. At the end of 15 minutes heating at 365° F. the formulation containing the stabilizer of the present invention was water white as compared to yellow for the other samples.

V 100 parts polyvinyl chloride
80 parts di-octyl phthalate
1 part zinc 2-ethyl butoxy acetate This plastisol mixture showed the following advantages:

A. Gave a viscosity at the end of 3 days of 4,700 centipoises vs. 7,000 centipoises for a similar composition containing a well-known Zn octoate stabilizer and 6,600 centipoises for the same formulation containing no stabilizer.

B. The final cured plastic was far superior in clarity over the Zn octoate stabilizer.

C. At the end of 15 minutes heating at 365° F. the formulation containing the stabilizer of the present invention was water white as compared to yellow for the other samples.

VI 100 parts polyvinyl chloride
80 parts di-octyl phthalate
1 part tin 2-ethyl hexoxy butyrate This plastisol mixture showed the following advantages:

A. Gave a viscosity at the end of 3 days of 6,000 centipoises vs. 7,200 centipoises for a similar composition containing a well-known dibutyl tin octoate stabilizer and 6,600 centipoises for the same formulation containing no stabilizer.

The same effects as in B and C above were also noted.

In summary, it can be said that the cadmium, zinc and tin cation salts of the oxygen ether acids have at least four major advantages over prior art stabilizers:

(1) They are extremely soluble in all major plasticizers, even in the absence of excess acidity.

(2) They are very heat stable and do not themselves decompose or discolor at elevated temperatures.

(3) Where other polyvinyl chloride stabilizers when added to plastisol mixtures increase viscosity, the present stabilizers actually reduce viscosity and very appreciably slow down the build-up of viscosity with time.

(4) The compositions of the present invention will be found to be compatible with any of the standard components which are usually added to halogenated hydrocarbon resins, such as, extenders, fillers, pigments and auxiliary stabilizers.

Other modes of applying the principle of the invention may be employed, change being made as regards to details described, provided the features stated in any of the following claims or the equivalent of such be employed.

We, therefore, particularly point out and distinctly claim as our invention:

1. A composition of matter comprising an intimate admixture of a halogenated hydrocarbon resin and from about 0.1% to about 8.0% by weight of said resin of a stabilizing and viscosity reducing compound said compound comprising a metal salt of the formula

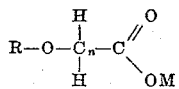

where R represents a radical of 4 to 20 carbons selected from the group consisting of alkyl, aryl, alkaryl and aralkyl, $n$ is an integer of 1 to 3 and M is a metal selected from the group consisting of cadmium, zinc and tin.

2. A composition of matter comprising an intimate admixture of a halogenated hydrocarbon resin and from about 0.1% to about 8.0% by weight of said resin of cadmium 2-ethyl butoxy propionate.

3. A composition of matter comprising an intimate admixture of a halogenated hydrocarbon and from about 0.1% to about 8.0% by weight of said resin of zinc 2-ethyl butoxy acetate.

4. A composition of matter comprising an intimate admixture of a halogenated hydrocarbon resin and from about 0.1% to about 8.0% by weight of said resin of tin 2-ethyl hexoxy butyrate.

5. A composition of matter comprising an intimate admixture of a halogenated hydrocarbon resin, dioctyl phthalate and from about 0.1% to about 8.0% by weight of said resin of cadmium 2-ethyl butoxy propionate.

References Cited in the file of this patent

UNITED STATES PATENTS

| | | |
|---|---|---|
| 2,198,292 | Reiff et al. | Apr. 23, 1940 |
| 2,252,665 | Reiff et al. | Aug. 12, 1941 |
| 2,307,075 | Quattlebaum et al. | Jan. 5, 1943 |
| 2,307,092 | Yngve | Jan. 5, 1943 |
| 2,344,002 | Rugely et al. | Mar. 14, 1944 |
| 2,377,267 | Reiff | May 29, 1945 |
| 2,669,548 | Darby et al. | Feb. 16, 1954 |
| 2,723,965 | Leistner et al. | Nov. 15, 1955 |